(12) United States Patent
Kanaya et al.

(10) Patent No.: US 11,465,276 B2
(45) Date of Patent: Oct. 11, 2022

(54) MOTION ASSIST SYSTEM AND MANAGEMENT DEVICE

(71) Applicant: JTEKT CORPORATION, Kariya (JP)

(72) Inventors: Manabu Kanaya, Nara (JP); Shinji Takeuchi, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 826 days.

(21) Appl. No.: 16/374,902

(22) Filed: Apr. 4, 2019

(65) Prior Publication Data

US 2019/0314977 A1    Oct. 17, 2019

(30) Foreign Application Priority Data

Apr. 11, 2018 (JP) .............................. JP2018-076141

(51) Int. Cl.
*B25J 11/00* (2006.01)
*B25J 9/00* (2006.01)

(52) U.S. Cl.
CPC ............. *B25J 9/0006* (2013.01); *B25J 9/006* (2013.01); *B25J 11/005* (2013.01); *B25J 11/008* (2013.01)

(58) Field of Classification Search
CPC ........ B25J 9/0006; B25J 9/006; B25J 11/005; B25J 11/008; A61H 1/0214; A61H 1/024; A61H 1/0244
USPC ...................... 414/222.01; 340/693.1; 36/136
See application file for complete search history.

(56) References Cited

U.S. PATENT DOCUMENTS

| | | | | |
|---|---|---|---|---|
| 7,689,394 B2 * | 3/2010 | Furem | ..................... | E02F 9/267 |
| | | | | 703/8 |
| 9,104,271 B1 * | 8/2015 | Adams | ..................... | G06F 3/014 |
| 10,694,948 B2 * | 6/2020 | Sandler | ..................... | A61H 3/00 |
| 10,893,913 B2 * | 1/2021 | Peine | ..................... | A61B 90/37 |
| 11,052,010 B2 * | 7/2021 | Oshima | ................ | A61H 1/0274 |
| 2006/0211956 A1 * | 9/2006 | Sankai | .................. | A61F 5/0102 |
| | | | | 601/5 |

FOREIGN PATENT DOCUMENTS

| | | |
|---|---|---|
| JP | 2010-113465 A | 5/2010 |
| JP | 2011-36374 A | 2/2011 |
| JP | 5493142 | 5/2014 |
| WO | WO 2016/093038 A1 | 6/2016 |

OTHER PUBLICATIONS

Office Action dated Mar. 1, 2022, in corresponding Japanese Patent Application No. 2018-076141 (with English Translation), 7 pages.

* cited by examiner

*Primary Examiner* — Dalena Tran
(74) *Attorney, Agent, or Firm* — Oblon, McClelland, Maier & Neustadt, L.L.P.

(57) ABSTRACT

A motion assist system includes a plurality of assist devices and a management device configured to manage the assist devices. The assist device includes: a power portion configured to generate power that assists the motion of the assist target person; a communication portion communicable with the management device; and a control device configured to transmit motion information of the power portion to the management device. The management device generates overall information that unifies working states of the assist target persons based on pieces of motion information and presents at least part of the overall information to the assist target persons or an administrator.

6 Claims, 4 Drawing Sheets

MOTION ASSIST SYSTEM AND MANAGEMENT DEVICE

INCORPORATION BY REFERENCE

The disclosure of Japanese Patent Application No. 2018-076141 filed on Apr. 11, 2018 including the specification, drawings and abstract is incorporated herein by reference in its entirety.

BACKGROUND

1. Technical Field

The disclosure relates to a motion assist system used in a factory or the like and a management device.

2. Description of Related Art

In recent years, an assist device for reducing a burden to the waist or the like of an operator at the time of a heavy work has been used. The assist device is also referred to a power assistance suit or a powered exoskeleton and is put on the body of an assist target person so as to assist the motion of an assist target body part (a waist, an arm, or the like) of the assist target person.

Japanese Patent No. 5493142 (JP 5493142 B) proposes a technique in which an assist device transmits its own motion historical information to an administrator side and receives update information corresponding to the state of a motion function along with the motion of a wearer from the administrator side, and the assist device performs an optimum assist motion based on the update information.

SUMMARY

In the meantime, in a factory, for example, the assist device is often used in operations performed by a plurality of operators outside a manufacturing line, e.g., loading and unloading of products or components, conveyance of heavy goods, and so on. The operating status of the manufacturing line is collectively managed via a telecommunication network in the factory, but it has been difficult to manage the work statuses of the operators outside the manufacturing line.

In view of this, the disclosure provides a motion assist system that can easily manage the work status of an operation by use of a plurality of assist devices, and a management device.

A first aspect of the disclosure relates to a motion assist system. The motion assist system includes a plurality of assist devices put on a plurality of assist target persons performing an assist target operation such that the assist devices assist respective motions of assist target body parts of the assist target persons; and a management device configured to manage the assist devices. Each of the assist devices includes: a power portion configured to generate power that assists the motion of the assist target body part; a communication portion communicable with the management device; and a control device configured to transmit motion information of the power portion to the management device via the communication portion. The management device is configured to generate overall information that unifies working states of the assist target persons based on pieces of motion information obtained from the assist devices and to present at least part of the overall information to the assist target persons or an administrator.

A second aspect of the disclosure relates to a management device for managing a plurality of assist devices put on a plurality of assist target persons performing an assist target operation. The assist devices are each configured to transmit, to the management device, motion information of a power portion configured to generate power that assists a motion of an assist target body part of a corresponding one of the assist target persons. The management device includes a processor. The processor is configured to generate overall information that unifies working states of the assist target persons based on pieces of motion information obtained from the assist devices and to present at least part of the overall information to the assist target persons or an administrator.

With the motion assist system and the management device of the disclosure, it is possible to easily manage respective work statuses of the assist target persons using the assist devices.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment

An embodiment of the disclosure will be described below with reference to FIGS. 1A to 5. Note that the embodiment described below indicates one preferred concrete example on performing the invention. There are some parts that specifically exemplify various technical matters that are technically preferable, but a technical scope of the invention is not limited to such concrete examples.

Description of Assist Device

Figure 1A:
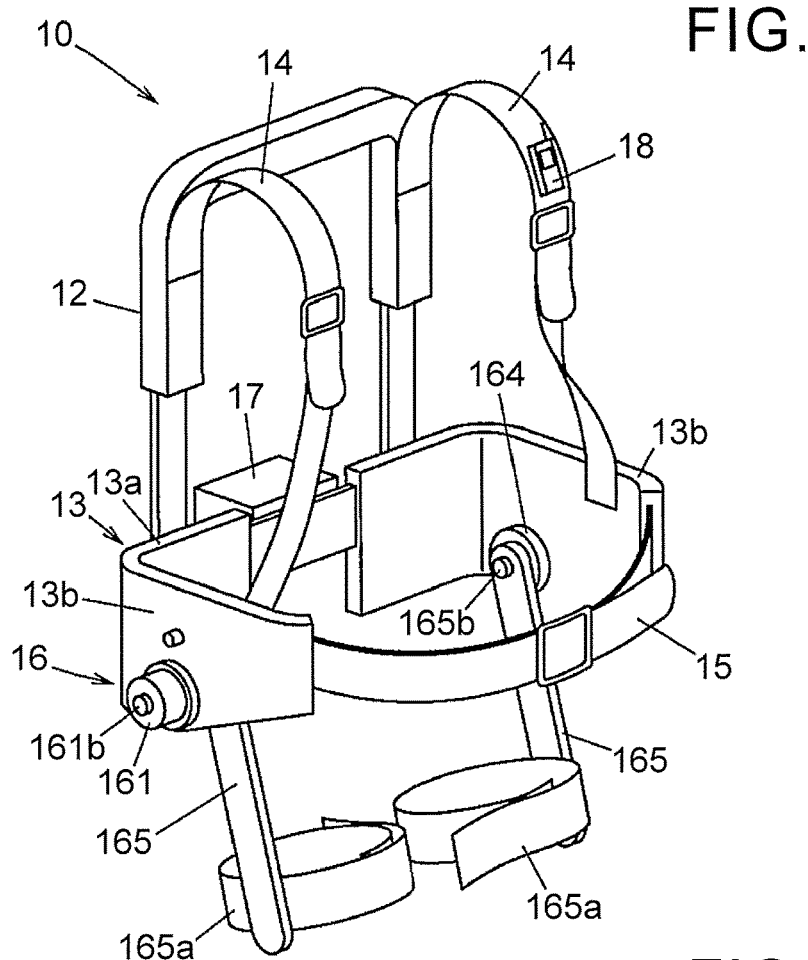
FIG. 1A is a perspective view illustrating an assist device used in a motion assist system according to one embodiment of the disclosure.
Figure 1B:
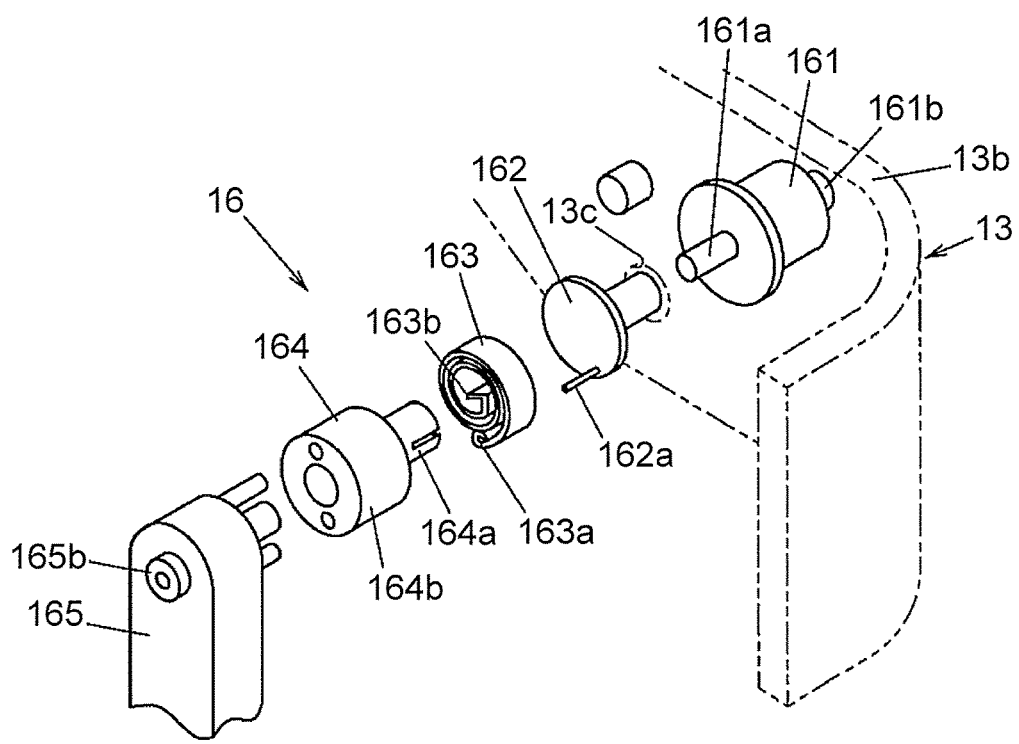
FIG. 1B is an exploded perspective view of an assist mechanism.
Figure 2:
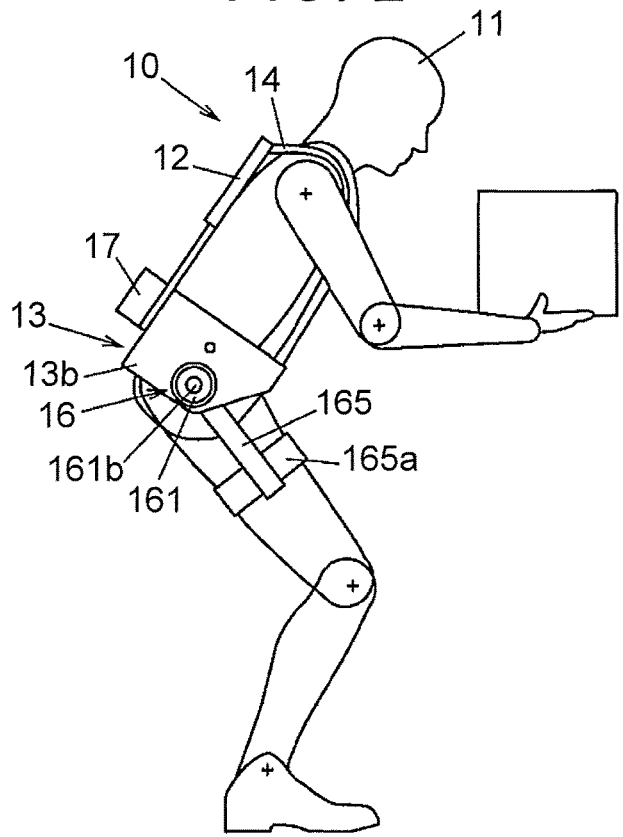
FIG. 2 is a schematic view illustrating the usage state of the assist device.
Figure 3:
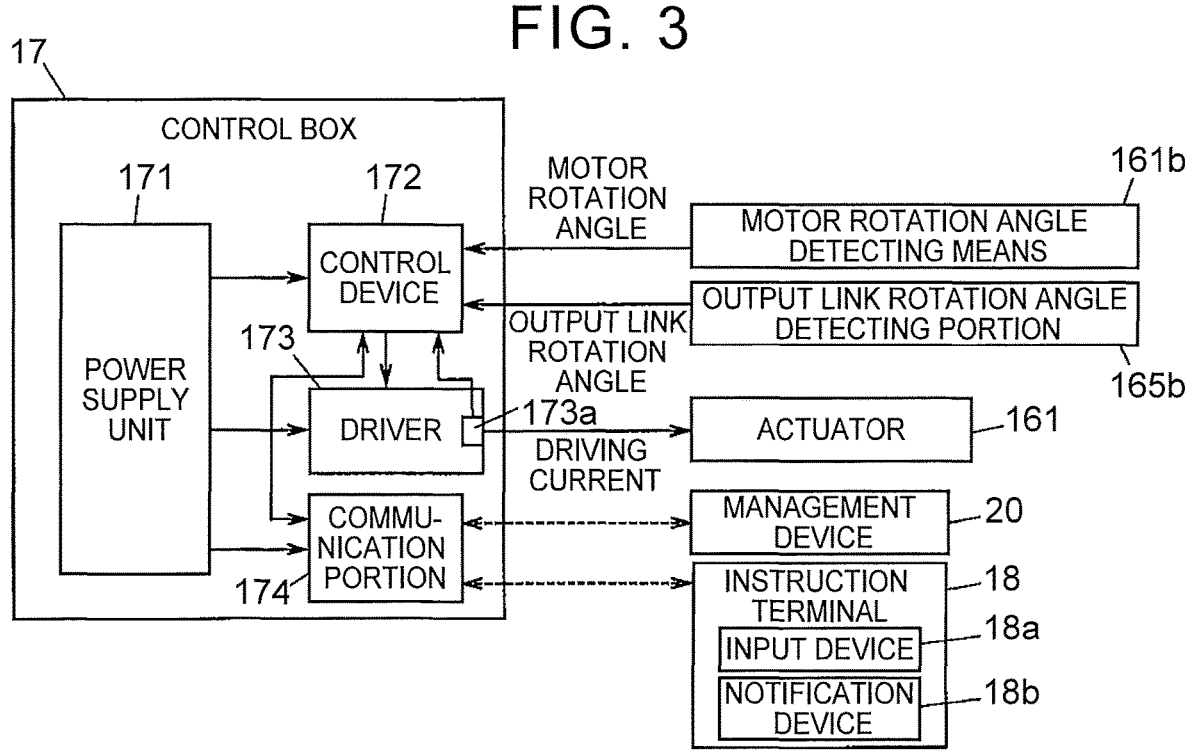
FIG. 3 is an explanatory view to describe input and output of a control device.

First described is an assist device used in a motion assist system according to the present embodiment. FIG. 1A is a perspective view of the assist device, and FIG. 1B is an exploded perspective view of an assist mechanism. FIG. 2 is a schematic view illustrating the usage state of the assist device. FIG. 3 is an explanatory view to describe input and output of a control device in the assist device.

As illustrated in FIGS. 1A, 1B, and 2, an assist device 10 is put on an assist target person 11 who performs an assist target operation and is configured to assist the motion of an assist target body part of the assist target person 11. The following describes a case where the assist device 10 assists the motion of the waist of the assist target person 11, but the assist target body part is not limited to this and may be an arm or a knee, for example. Further, the assist target body part is not limited to one part, and a plurality of parts (e.g., a waist and a knee) may be assisted.

The assist device 10 includes a harness 12 to be put on the assist target person 11 from the lumbar to the back, and a support frame portion 13 provided below the harness 12. The support frame portion 13 integrally includes a back portion 13a placed to cover the back face of the lumbar of the assist target person 11, and side face portions 13b, 13b placed to cover the opposite side faces of the lumbar of the assist target person 11. The side face portions 13b, 13b each have a bearing hole 13c at a position overlapping with the hip joint of the assist target person 11 in a side view.

The harness 12 is provided to extend upward from the back portion 13a of the support frame portion 13 and is provided with shoulder belts 14, 14 configured to connect an upper part of the harness 12 to the side face portions 13b, 13b of the support frame portion 13. Further, a front belt 15 is provided so as to connect respective front ends of the side face portions 13b, 13b of the support frame portion 13 to each other. When the shoulder belts 14, 14 are placed over the shoulders of the assist target person 11 and the front belt 15 is fastened on the front side of the abdomen of the assist target person 11, the harness 12 and the support frame portion 13 are fixed to the assist target person 11.

The side face portions 13b, 13b of the support frame portion 13 are each provided with an assist mechanism 16. The assist mechanism 16 includes an actuator 161 as a power portion constituted by an electric motor fixed the outside of the side face portion 13b, an input member 162 connected to a rotating shaft 161a of the actuator 161 in a relatively non-rotatable manner, a speed reducer 164, a spiral spring 163 provided between the input member 162 and the speed reducer 164, and an output link 165 connected to the speed reducer 164. The input member 162, the spiral spring 163, the speed reducer 164, and the output link 165 are placed inside the side face portion 13b.

The actuator 161 receives a driving current to be supplied and generates power (torque) to assist the motion of the assist target body part of the assist target person 11. The rotating shaft 161a that is a power output member of the actuator 161 is passed through the bearing hole 13c so as to be connected to the input member 162 inside the bearing hole 13c. Motor rotation angle detecting means 161b such as a motor encoder that detects a rotation angle of the rotating shaft 161a is provided in the actuator 161.

The input member 162 transmits the power of the actuator 161 to the spiral spring 163. The input member 162 includes a transmission shaft 162a provided to axially extend at a position eccentric to the rotating axis of the input member 162 and connected to an outer end 163a of the spiral spring 163 in a relatively non-rotatable manner. The spiral spring 163 is formed by shaping a belt-shaped flat spring into a coiled shape and is configured to convert, into an assist torque, a rotational amount transmitted from the actuator 161 via the input member 162.

The speed reducer 164 includes an input rotary portion 164a connected to an inner end 163b of the spiral spring 163 in a relatively non-rotatable manner, an output rotary portion 164b connected to the output link 165 in a relatively non-rotatable manner, and a gear mechanism (not shown) provided between the input rotary portion 164a and the output rotary portion 164b. The speed reducer 164 is configured to reduce a rotational amount caused by the assist torque transmitted from the spiral spring 163 and transmit the assist torque to the output link 165.

The output link 165 is a bar-shaped member placed along an outer surface of the thigh of the assist target person 11. A first end of the output link 165 is connected to the output rotary portion 164b of the speed reducer 164 in a relatively non-rotatable manner. A second end of the output link 165 is provided with a mounting fixture 165a put on the thigh of the assist target person 11. The output link 165 is provided with an output link rotation angle detecting portion 165b such as an encoder or a potentiometer for detecting a rotation angle of the output link 165.

An instruction terminal 18 is attached to one of the shoulder belts 14 so as to be detachable from the shoulder belts 14. The instruction terminal 18 is configured to perform notification of an alert from an administrator and fine-adjustment of an assist control. Details of the instruction terminal 18 will be described later.

A control box 17 is provided on the back face of the harness 12. As illustrated in FIG. 3, a power supply unit 171, a control device 172, a driver 173, and a communication portion 174 are accommodated in the control box 17. The power supply unit 171 is constituted by, for example, a battery unit using a secondary battery such as a lithium cell and supplies power to the control device 172, the driver 173, and the communication portion 174.

The control device 172 controls the actuator 161 via the driver 173 based on the rotation angle of the output link 165, detected by the output link rotation angle detecting portion 165b, the rotation angle of the actuator 161, detected by motor rotation angle detecting means 161b, and the driving current of the actuator 161. The driver 173 is a driver circuit for a motor that supplies the driving current to the actuator 161 based on a control signal from the control device 172. The driver 173 is provided with a current measuring portion 173a configured to measure the driving current of the actuator 161.

The communication portion 174 is a wireless communications device configured to perform communication with a management device 20 (described later) and communication with the instruction terminal 18. The communication method in the communication portion 174 is not limited in particular. For example, a method in conformity with the IEEE802.23 standard that is an international standard of wireless communication, represented by Wi-Fi (registered trademark), a method in conformity with the IEEE802.15.1 standard that is an international standard of wireless communication, represented by Bluetooth (registered trademark), or the like can be used.

The instruction terminal 18 includes an input device 18a into which an operator code to specify the assist target person 11 can be input. The operator code input into the instruction terminal 18 is output to the control device 172 via the communication portion 174. The input device 18a may be configured to perform fine-adjustment on the assist control or may be configured such that assist strength in the assist control may be input therein. The assist strength input in the instruction terminal 18 is output to the control device 172 via the communication portion 174, so that the assist control corresponding to the assist strength received by the control device 172 is performed.

Further, the instruction terminal 18 includes a notification device 18b configured to notify the assist target person 11 of reception of an alert when the instruction terminal 18 receives a notification signal to notify the alert from the control device 172. The notification device 18b notifies the assist target person 11 of reception of an alert signal by notification by a sound using a buzzer, notification by light using a light emitting device such as a light emitting diode, vibration with a vibrator, display of an alert content using a display device such as a display, or a combination thereof.

Description of Motion Assist System

Figure 4:
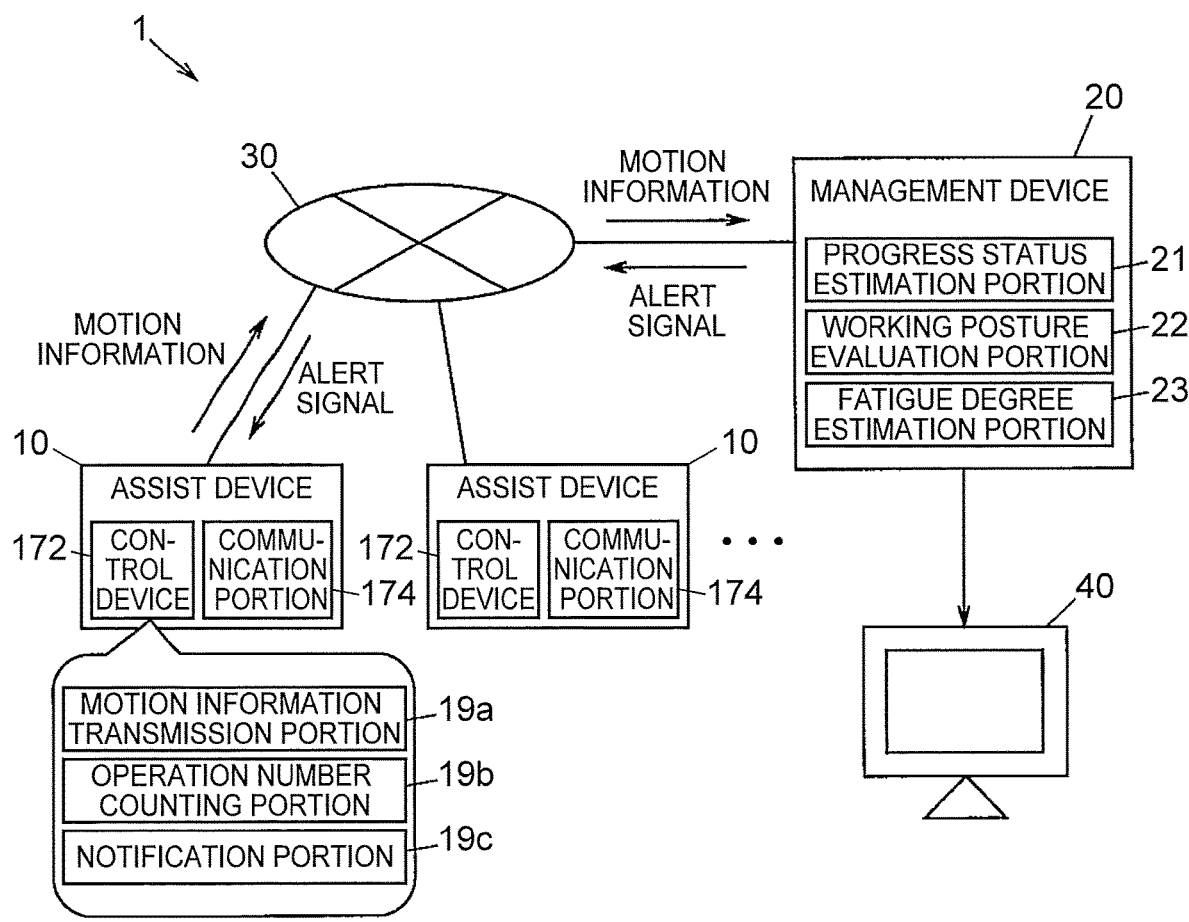
FIG. 4 is a schematic configuration diagram of the motion assist system.

FIG. 4 is a schematic configuration diagram of the motion assist system. As illustrated in FIG. 4, the motion assist system 1 includes a plurality of assist devices 10 and a management device 20 configured to manage the assist devices 10.

The assist devices 10 each include a communication portion 174 communicable with the management device 20 so as to be communicable with the management device 20 via a network 30. The network 30 is a private network such as the Intranet that is set in a factory or the like, for example. Note that the assist devices 10 are not limited to this, and the management device 20 may be configured to be directly communicable with each of the assist devices 10.

The assist device 10 includes a motion information transmission portion 19a, an operation number counting portion 19b, and a notification portion 19c The motion information transmission portion 19a, the operation number counting portion 19b, and the notification portion 19c are provided in the control device 172 and are implemented by appropriately combining a processor such as a CPU, a memory such as a RAM or a ROM, software, an interface, and the like.

The motion information transmission portion 19a transmits motion information of the actuator 161 of the assist device 10 to the management device 20 via the communication portion 174. In the present embodiment, the motion information transmission portion 19a transmits the number of times that the assist target person 11 performs an assist target operation, a value of the driving current of the actuator 161, measured by the current measuring portion 173a, an operator code input in the input device 18a of the instruction terminal 18, and the like to the management device 20 as the motion information.

The operation number counting portion 19b counts the number of times that the assist target person 11 performs the assist target operation. The operation number counting portion 19b counts the number of times that the assist target person 11 performs the assist target operation such as a carrying operation, based on a waveform of the driving current of the actuator 161, for example. The number of times of the assist target operation, counted by the operation number counting portion 19b, is output to the motion information transmission portion 19a and transmitted to the management device 20 via the communication portion 174.

When an alert signal is received from the management device 20 via the communication portion 174, the notification portion 19c notifies the assist target person 11 that the alert signal is received. In the present embodiment, when the alert signal is received, the notification portion 19c transmits a notification signal corresponding to the content of the alert signal to the instruction terminal 18 via the communication portion 174. In response to the notification signal thus received, the notification device 18b of the instruction terminal 18 generates sound, light, or vibration or displays the notification on a display device, so as to notify the assist target person 11 that the alert signal is received.

Note that, although not illustrated herein, the motion assist system 1 may further include physiological information acquisition means configured to acquire physiological information (vital data) such as a heart rate of the assist target person 11 and transmit the physiological information thus acquired to the management device 20. The physiological information acquisition means may be provided in each of the assist devices 10 or may be provided separately from the assist devices 10.

The management device 20 generates overall information that unifies the working states of a plurality of assist target persons 11 based on pieces of motion information obtained from the assist devices 10 and presents at least part of the overall information to the assist target persons 11 or the administrator. In the present embodiment, a display 40 is connected to the management device 20, and when the management device 20 displays the overall information thus generated on the display 40, the overall information is presented to the administrator. The overall information as used herein includes progress information of the assist target operation, information of a working posture of each assist target person 11, information of a fatigue degree of each assist target person 11, and so on.

The management device 20 includes a progress status estimation portion 21, a working posture evaluation portion 22, and a fatigue degree estimation portion 23. The progress status estimation portion 21, the working posture evaluation portion 22, and the fatigue degree estimation portion 23 are implemented by appropriately combining a processor such as a CPU, a memory such as a RAM or a ROM, software, a storage, an interface, and the like.

The progress status estimation portion 21 estimates the progress status of the assist target operation (e.g., loading and unloading of products or components) based on the number of times that the assist target person 11 performs the assist target operation, from the motion information received by the management device 20 from the assist device 10. The progress status estimation portion 21 calculates a ratio of the number of times that the assist target operation is performed to a target operation number set in advance for each assist target person 11. Further, the progress status estimation portion 21 calculates a total value of respective numbers of times of the assist target operation, received from the assist devices 10, and calculates a ratio of the total value of the numbers of times of the assist target operation to a target total operation number set in advance. These results are displayed on the display 40.

Hereby, the administrator can know the entire progress status of the assist target operation performed by the assist target persons 11. By knowing the progress status, the administrator can instruct the assist target person 11 with slow progress to perform the operation more quickly or dispatch an operator from a work area with relatively fast progress to the work area of the assist target person 11 with slow progress.

Further, in a case where the motion assist system 1 is applied to a factory having a manufacturing line, the operating status of the manufacturing line of the factory is also input into the management device 20, so that the progress status in the entire factory including the manufacturing line and the operation outside the line can be managed by the management device 20.

Furthermore, the present embodiment describes a case where the assist device 10 has a function (the operation number counting portion 19b) to count the number of times that the assist target operation is performed. However, the function to count the number of times that the assist target operation is performed may be provided in the management device 20 side. That is, the management device 20 may have a function to count the number of times that the assist target operation such as a carrying operation is performed, based on a waveform of the driving current of the actuator 161, the waveform being received from the assist device 10, for example.

The working posture evaluation portion 22 evaluates the working posture of the assist target person 11, based on a value of the driving current of the actuator 161, from the motion information received by the management device 20 from the assist device 10. More specifically, a received current waveform of the driving current of the actuator 161 is compared with a reference current waveform acquired in advance, so that the working posture evaluation portion 22 evaluates the working posture of the assist target person 11. As the reference current waveform, a waveform of the driving current at the time when an operation is performed with a right posture should be acquired in advance for each assist target person 11 and stored in association with the operator code of the assist target person 11.

In this case, the working posture evaluation portion 22 refers to the reference current waveform stored in association with the operator code of the assist target person 11 who uses the assist device 10, and when a difference between the reference current waveform and a present current waveform is larger than a predetermined amount, the working posture evaluation portion 22 determines that the assist target person 11 has a poor working posture and displays the determination on the display 40. Hereby, the administrator can know whether or not the assist target person 11 performs the assist target operation with a right posture. Further, when it is determined that the assist target person 11 has a poor working posture, the working posture evaluation portion 22 may transmit an alert signal to the assist device 10 to notify the assist target person 11 that the assist target person 11 has a poor working posture. This makes it possible to restrain the assist target person 11 from having a low back pain and the like, thereby making it possible to restrain a decrease in working efficiency due to dropout of the assist target person 11.

Further, the working posture evaluation portion 22 may be configured to compare current waveforms of respective driving currents of the assist target persons 11 who perform a similar assist target operation and evaluate variations in working posture at the time when a predetermined assist target operation is performed. Furthermore, the working posture evaluation portion 22 may calculate, for each assist target person 11, a ratio of the number of times that the assist target operation is performed with a right working posture to the number of times that the assist target operation is performed with a poor working posture and evaluate the level of skill (the level of performance) to a predetermined assist target operation based on the ratio. By evaluating the level of skill (the level of performance) of the assist target person 11, it is possible to determine an operation suitable for the assist target person 11, thereby making it possible to arrange a right person in the right place.

The fatigue degree estimation portion 23 estimates a fatigue degree of the assist target person 11 who uses the assist device 10, based on the motion information received from the assist device 10. The fatigue degree estimation portion 23 estimates a fatigue degree of the assist target person 11 based on the number of times that the assist target operation is performed, working hours, and the like, for example. In a case where the motion assist system 1 includes physiological information acquisition means, the fatigue degree estimation portion 23 may estimate the fatigue degree further in consideration of physiological information (vital data) such as a heart rate of the assist target person, acquired by the physiological information acquisition means.

Further, when the fatigue degree is a predetermined degree or more, the fatigue degree estimation portion 23 may transmit an alert signal to promote a break to the assist device 10 or display, on the display 40, information indicating that a break is necessary. By promoting a break at an appropriate timing, the working efficiency of the assist target operation can be improved.

It is desirable that the management device 20 be configured to transmit an alert signal for an alert or an instruction to a given assist device 10 by the operation of the administrator at any time. The alert signal may include a signal to perform a specific instruction of an operation, a signal to perform warning at the time of a dangerous operation, a signal to promote immediate stop of an operation for a safety reason or the like, and so on, in addition to the alert signal to promote a break and the alert signal to notify a poor working posture.

Further, although not illustrated in FIG. 4, the motion assist system 1 may include positional information acquisition means configured to acquire positional information of the assist device 10. As the positional information acquisition means, a positional information acquisition signal output portion configured to output a positional information acquisition signal may be provided in the assist device 10, a plurality of antennas may be provided at intervals near a predetermined work site such as a factory, and the position of the assist device 10 may be specified by comparing reception strengths of respective positional information acquisition signals received by the antennas. By acquiring the positional information of the assist device 10, it is possible to specify the position of the assist target person 11 in real time, and this contributes to rearrangement of an operation route in a factory, optimization of personnel distribution, and the like.

Exemplary Application of Motion Assist System 1

Figure 5:
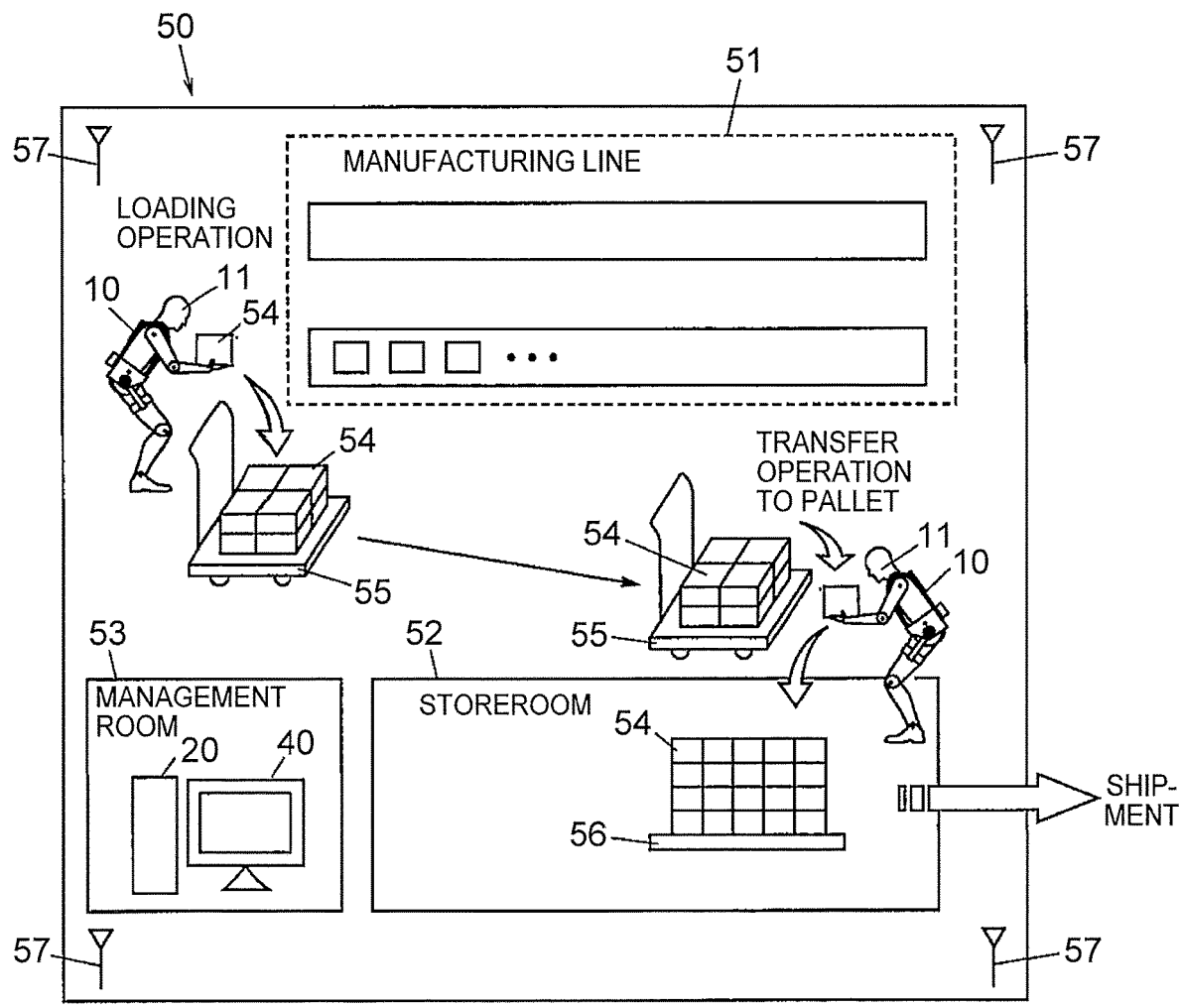
FIG. 5 is a schematic view when the motion assist system is applied to a factory.

FIG. 5 is a schematic view when the motion assist system 1 is applied to a factory. A factory 50 illustrated in FIG. 5 includes a manufacturing line 51 for manufacturing products such as bearings, a storeroom 52 in which cases 54 each containing the products manufactured by the manufacturing line 51 are stored, and a management room 53 used by the administrator. Antennas 57 used as the positional information acquisition means are placed at four corners of the factory 50. In the management room 53, the management device 20 and the display 40 are placed, and the management of a work status by the administrator is performed. In the factory 50, the cases 54 in which the products manufactured by the manufacturing line 51 are encased are loaded onto a wagon 55, and the wagon 55 on which the cases 54 are loaded is carried to the storeroom 52. After that, an operation of transferring the cases 54 from the wagon 55 to a pallet 56 for transportation is performed in the storeroom 52. Among those operations, the operation of loading the cases 54 onto the wagon 55, and the operation of transferring the cases 54 from the wagon 55 to the pallet 56 are assist target operations performed by use of the assist device 10. The cases 54 thus transferred to the pallet 56 are loaded onto a truck by a fork lift (not shown) and are shipped from the storeroom 52.

Since the motion assist system 1 is applied to the factory 50, the administrator can grasp the work status (the progress statuses of the operations, and the working posture, the fatigue degree, the positional information, and the like of each assist target person 11) in terms of the operation of loading the cases 54 onto the wagon 55 and the operation of transferring the cases 54 from the wagon 55 to the pallet 56 as the assist target operations. Further, by collectively managing the operating status of the manufacturing line 51 by the management device 20, it is possible to perform a production control of the entire factory 50.

Operations and Effects of Embodiment

In the present embodiment described above, the management device 20 generates overall information that unifies respective working states of the assist target persons 11, based on pieces of motion information obtained from the assist devices 10, and presents at least part of the overall information to the assist target persons 11 or the administrator. Hereby, the assist target persons 11 or the administrator can grasp the work status of the assist target operation, so that the work status of the assist target operation can be easily managed. Hereby, improvement of the productivity can be achieved.

Additional Matters

The invention has been described based on the embodiment, but the embodiment described above does not limit the invention according to Claims. Further, it should be noted that all combinations of features described in the embodiment may not necessarily be essential to the means for solving the problem of the invention.

Further, the invention can be carried out with various modifications within a range that does not deviate from the gist of the invention. For example, the assist device 10 described in the embodiment is just an example, and a specific configuration of the assist device 10 is not limited to this. Further, the above embodiment deals with a case where the assist device 10 is used mainly in a factory. However, the invention is not limited to this. For example, the motion assist system 1 can be applied to work places of various heavy works including an operation in a storeroom for distribution, an operation at a construction site, and so on.

Further, the above embodiment deals with a case where the assist device 10 includes the instruction terminal 18. However, the instruction terminal 18 is not essential, and the input device 18*a* and the notification device 18*b* may be provided in the support frame portion 13 or the control box 17.

What is claimed is:

1. A motion assist system comprising:
a plurality of assist devices put on a plurality of assist target persons performing an assist target operation such that the assist devices assist respective motions of assist target body parts of the assist target persons; and
a management device configured to manage the assist devices, wherein:
each of the assist devices includes
a power portion configured to generate power that assists the motion of the assist target body part,
a current measuring portion configured to measure a driving current supplied to the power portion,
a communication portion communicable with the management device, and
a control device configured to transmit motion information of the power portion based on a value of the driving current measured by the current measuring portion to the management device via the communication portion;
the management device is configured to generate overall information that unifies working states of the assist target persons based on pieces of motion information obtained from the assist devices and to present at least part of the overall information to the assist target persons or an administrator,
the management device is configured to estimate a progress status of the assist target operation by comparing a number of times that an assist target person of the plurality of assist target persons performs the assist target operation to a predetermined target operation number, the number of times that the assist target person of the plurality of assist target persons performs the assist target operation being determined based on the motion information,
the management device is configured to evaluate a working posture of the assist target person of the plurality of assist target persons by comparing a received current waveform of the driving current with a reference current waveform acquired in advance, and evaluate a level of skill of the assist target person of the plurality of assist target persons based on the evaluated working posture, and
the management device is configured to estimate a fatigue degree of the assist target person based on the number of times that the assist target person of the plurality of assist target persons performs the assist target operation.

2. The motion assist system according to claim 1, wherein the control device is configured to count the number of times that the assist target operation is performed and to transmit, to the management device, the counted number of times that the assist target operation is performed, as the motion information.

3. The motion assist system according to claim 1, wherein:
the management device is configured to transmit an alert signal for a warning or an instruction to the assist device; and
the assist device includes a notification portion configured to notify the assist target person that the alert signal is received, when the alert signal is received.

4. The motion assist system according to claim 1, further comprising antennas configured to acquire positional information of the plurality of assist devices.

5. A management device for managing a plurality of assist devices put on a plurality of assist target persons performing an assist target operation, the assist devices being each configured to transmit, to the management device, motion information of a power portion configured to generate power that assists a motion of an assist target body part of a corresponding one of the assist target persons, the motion information being based on a value of a measured driving current supplied to the power portion, the management device comprising:
a processor,
wherein the processor is configured to generate overall information that unifies working states of the assist target persons based on pieces of motion information obtained from the assist devices and to present at least part of the overall information to the assist target persons or an administrator,
wherein the processor is configured to estimate a progress status of the assist target operation by comparing a number of times that an assist target person of the plurality of assist target persons performs the assist target operation to a predetermined target operation number, the number of times that the assist target person of the plurality of assist target persons performs the assist target operation being determined based on the motion information, wherein the processor is configured to evaluate a working posture of the assist target person of the plurality of assist target persons by comparing a received current waveform of the driving current with a reference current waveform acquired in advance, and evaluate a level of skill of the assist target person of the plurality of assist target persons based on the evaluated working posture, and the processor is configured to estimate a fatigue degree of the assist target person based on the number of times that the assist target person of the plurality of assist target persons performs the assist target operation.

6. The management device according to claim 5, wherein the processor is configured to transmit an alert signal for a warning or an instruction to the assist devices.

\* \* \* \* \*